United States Patent

Hall

[15] 3,685,864
[45] Aug. 22, 1972

[54] LOCKING PIN COUPLING

[72] Inventor: Robert M. Hall, R.R. 4, Sidney, Ohio 45365

[22] Filed: March 22, 1971

[21] Appl. No.: 126,430

[52] U.S. Cl.....................................287/100, 280/515
[51] Int. Cl...............................................F16c 11/00
[58] Field of Search................85/5 CP, 8.9; 280/515; 287/100

[56] References Cited

UNITED STATES PATENTS 3,146,003   8/1964   De Ronde..................280/515

FOREIGN PATENTS OR APPLICATIONS 688,130   2/1940   Germany....................280/515

OTHER PUBLICATIONS

German printed application, 1,145,494 3/1963 Steingass

*Primary Examiner*—Andrew V. Kundrat
*Attorney*—Alan J. Steger

[57] ABSTRACT

A coupling device is provided which is well suited for locking two members together where it is desired to have limited pivotal movement between the members being coupled, such as farm equipment. This coupling device features a unique safety lock pin which incorporates an integral retaining disk formed at a location along the length of the pin and which is spaced from a head or handle portion at one end of the pin. The coupling device further includes a spring-loaded latch which is pivotally mounted on one of the members to be coupled and is adapted to automatically engage the retaining disk to hold the members in coupled relationship when the safety lock pin is inserted through aligned openings in the members. The spring-loaded latch is pivotable against a spring to release the safety lock pin when it is desired to retract the safety lock pin and uncouple the members being coupled.

6 Claims, 3 Drawing Figures

PATENTED AUG 22 1972
3,685,864
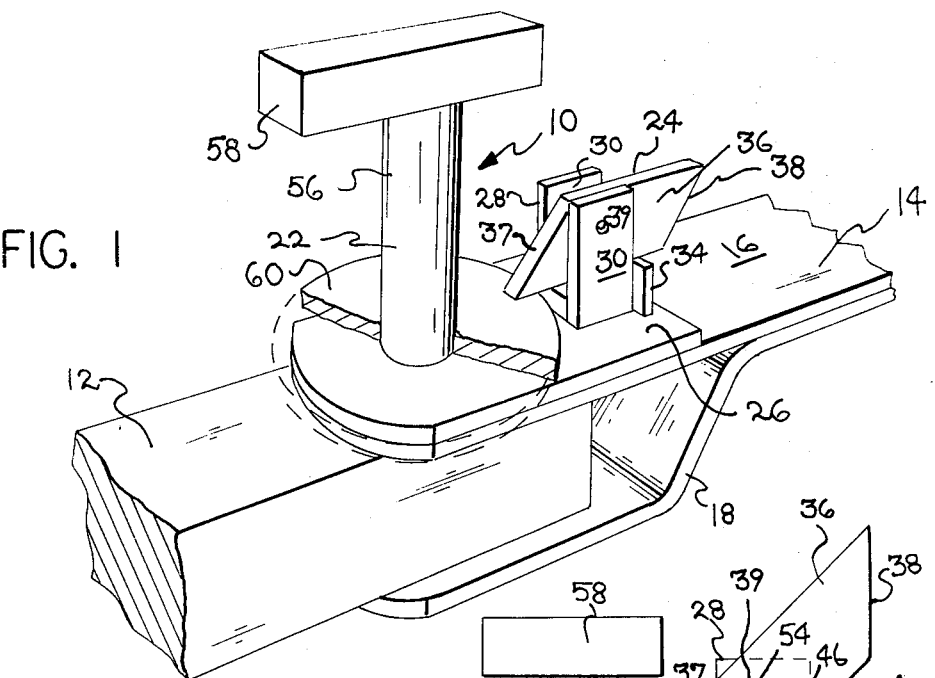
FIG. 1
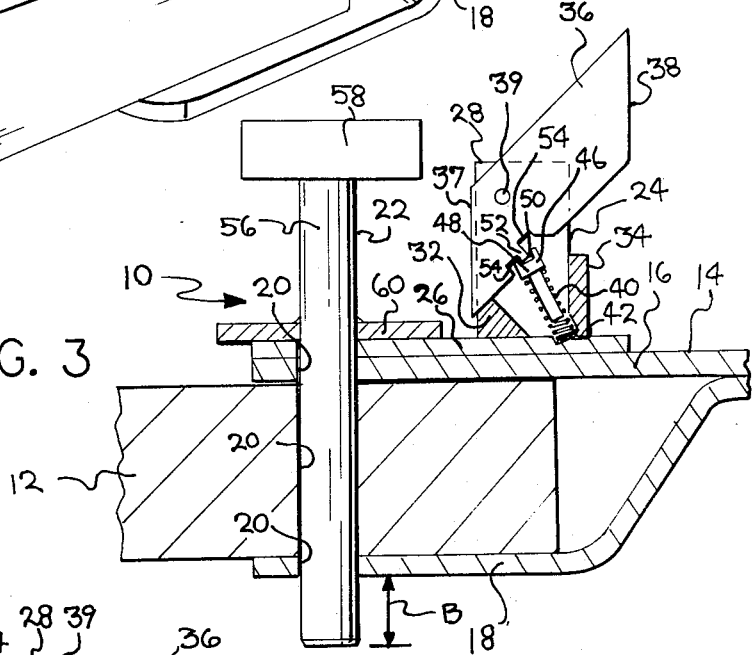
FIG. 3
FIG. 2
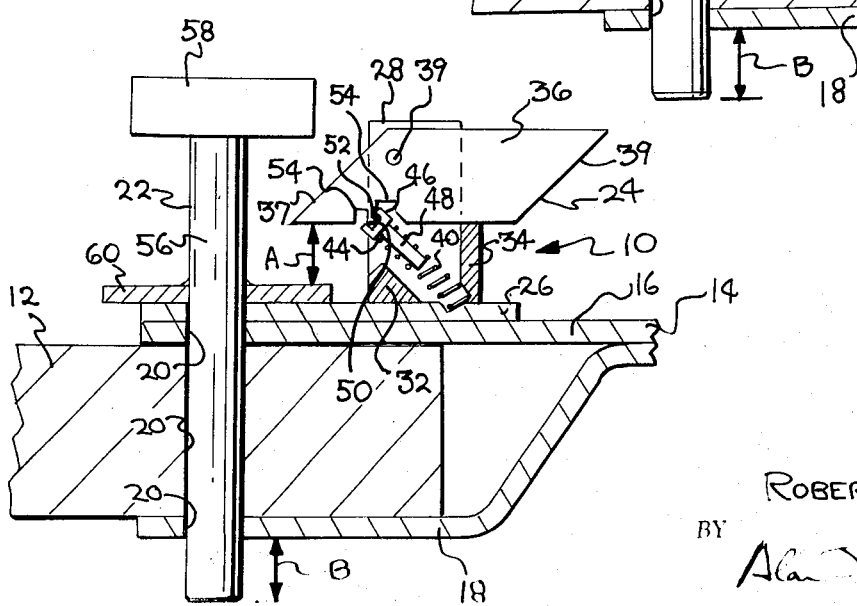
INVENTOR.
ROBERT M. HALL
BY Alan D. Stage
ATTORNEY

LOCKING PIN COUPLING

BACKGROUND OF THE INVENTION

This invention relates to a coupling device and, more particularly, to a locking pin coupling adapted to lock two members together while allowing pivotal movement between the members being coupled. The unique locking pin coupling of this invention is well suited for coupling farm equipment, such as, for example, a wagon to a tractor.

Typically, farm equipment has been coupled for movement together by means of a clevis-type hook and pin. One of the disadvantages of this type of coupling is that the pin is free to bounce out when the equipment is driven over rough terrain. In addition, this type of coupling incorporates a spring-loaded wire which frequently catches on the crops (e.g., corn stalks) and unhooks the coupling.

Other types of couplings for connecting farm equipment have utilized cotter pins which result in difficult and time-consuming connecting and disconnecting procedures. Also, cotter pins usually break after repeated connections and disconnections.

Thus, there has been a distinct need for an improved coupling device which is suited for coupling farm equipment and which eliminates the disadvantages associated with previously used such coupling devices.

SUMMARY OF THE INVENTION

It is, therefore, an object of this invention to provide an improved coupling device which is well suited for locking two members together where it is desired to have limited pivotal movement between the members being coupled, such as farm equipment.

The coupling device of this invention features a unique safety lock pin which incorporates an integral retaining disk formed at a location along the length of the pin and which is spaced from a head or handle portion at one end of the pin. Further included in the locking pin coupling of this invention is a spring-loaded latch which is pivotally mounted on one of the members to be coupled and is adapted to automatically engage the retaining disk to hold the members in coupled relationship when the safety lock pin is inserted through aligned openings in the members. The spring-loaded latch is pivotable against a spring to release the safety lock pin when it is desired to retract the safety lock pin and uncouple the members being coupled.

Other objects, features, and advantages of the unique locking pin coupling of this invention will become obvious upon reference to the succeeding detailed description and drawings of a preferred embodiment thereof.

IN THE DRAWINGS:

FIG. 1 is a perspective view illustrating a unique locking pin coupling incorporating the features of this invention.

FIG. 2 is an elevation view with parts in section of the locking pin coupling of FIG. 1 with the spring-loaded latch member in the locked position.

FIG. 3 is an elevational view with parts in section of the locking pin coupling of FIG. 1 with the spring-loaded latch member in the open or unlocked position.

DETAILED DESCRIPTION OF A PREFERRED EMBODIMENT

Although in its preferred embodiment the locking pin coupling of this invention is described in connection with connecting farm equipment, such as a tractor and a wagon, it should be understood that it is well suited to couple a wide variety of members where limited pivotal movement between the members being coupled is desired.

In each Figure of the drawings, a unique locking pin coupling incorporating the features of this invention is illustrated and indicated generally by the numeral 10. The locking pin coupling 10 is utilized in this embodiment to pivotally connect a first member 12 to a second member 14. The first member 12 may be, for example, a tongue or bar on the rear portion of a farm tractor. The second member 14 likewise may be, for example, a hitch device on the front of a farm wagon. The wagon hitch 14 includes upper and lower plates 16 and 18, respectively, which are separated by a space of sufficient size to receive the tractor tongue 12 therebetween. The tractor tongue 12 and each of the upper and lower plates 16 and 18 of the wagon hitch 14 include identically sized apertures 20 formed therethrough which may be aligned upon insertion of the tractor tongue a certain distance into the space between the upper and lower plates 16 and 18 of the wagon hitch 14.

The locking pin coupling 10 of this invention contains two main structural components, namely a safety lock pin 22 and a spring-loaded latch unit 24. The latch unit 24 includes a base member 26 which is fixed or attached to the upper surface of the upper plate 16 of the wagon hitch 14 by means of bolts (not shown) or by welding. A U-shaped bracket or support member 28 incorporating two side panels 30 and a connecting panel 32 therebetween is attached to the base 26 with the open end of its U-shape facing upwardly away from the base 26. A second connecting panel 34 extends on edge between the side panels 30 and serves as a stop means as will be described hereinafter. A special parallelogram-shaped latch member 36 includes front and rear tapered surfaces 37 and 38, respectively, and is pivotally mounted between the side panels 30 of the U-shaped support 28 by means of a pivot rod 39. The pivot rod 39 is attached at its opposite ends to the side panels 30 and suspends the latch member 36 for pivotal movement therebetween. The latch member 36 is biased into the horizontal or locking position as shown in FIGS. 1 and 2 by means of a coil spring 40 which is attached at one end 42 to the base 26 and at its other end 44 to a head portion 46 of a spring bolt 48 positioned therein. The head portion 46 of the spring bolt 48 includes a kerf 50 which is adapted to engage a lug 52 formed between two slots 54 on the lower edge of the latch member 36. Thus, the spring 40 biases the spring bolt 48 into engagement with the latch 36 to pivot the latch 36 to the horizontal or locking position as shown in FIGS. 1 and 2 where the second connecting panel 34 serves as a stop means for the latch 36. The latch 36 may be pivoted to the open or unlocked position by raising up on its rear tapered surface 38 to bias the latch 36 against the spring bolt 48 to compress the spring 40 as shown in FIG. 3.

The safety lock pin 22 is T-shaped in that it includes a cylindrical shaft portion 56 and generally rectangular head or handle portion 58. The cylindrical shaft 56 is sized to have a diameter suited to slide through the apertures 20 formed in the tractor tongue 12 and wagon hitch 14 when they are in alignment. The head or handle 58 is shaped to be easily grasped by a human hand for insertion and retraction of the safety lock pin 22. The safety lock pin 22 also incorporates a retaining disk 60 formed integrally with the shaft 56 at a location along the length of the shaft 56 which is spaced from the head or handle 58. When the safety lock pin is fully inserted into engagement with the tractor tongue 12 and wagon hitch 14 the retaining disk 60 rests on the base 26 beneath the front edge of the latch 36. Therefore, the retaining disk 60 must be of sufficient diameter to extend under the front edge of the latch 36 to prevent the withdrawal of the safety lock pin 22 when the latch is in the locking position as shown in FIGS. 1 and 2.

The operation of the locking pin coupling 10 incorporating the unique features of this invention, while relatively simple, is very effective to couple two members together. The tractor tongue 12 is slid into position between the upper and lower plates 16 and 18 of the wagon hitch 14 so that the apertures 20 of these members are in alignment. Next, the safety lock pin 22 is grasped by its handle 58 and inserted into engagement with the tractor tongue 12 and wagon hitch 14 so that the shaft 56 extends through the aligned apertures 20 therein. As the shaft 56 is moved further through the apertures 20 in the tractor tongue 12 and wagon hitch 14, the retaining disk 60 engages the front tapered surface 37 of the latch 36 to pivot it downwardly until the retaining disk passes therebeneath. The coupling then assumes the position shown in FIGS. 1 and 2 wherein the retaining disk 60 rests on the base 26 and latch 36 is spring-biased to the horizontal or locking position. In this position, the latch 36 prevents the withdrawal of the safety lock pin 22 thereby providing a locked coupling between the tractor tongue 12 and wagon hitch 14. When it is desired to retract the safety lock pin 22 and uncouple the tractor tongue 12 and wagon hitch 14, the latch 36 is pivoted to the unlocked position shown in FIG. 3 by raising up on its rear tapered surface 36. This movement pivots the front tapered surface 37 of the latch 36 out of overlying relationship with the retaining disk 60 to facilitate withdrawal of the safety lock pin 22. After removal of the safety lock pin 22 the latch 36 may be released to assume its spring-biased horizontal position. Thus, the combination safety lock pin and latch mechanism of the coupling device of this invention automatically locks the members being coupled together upon insertion of the safety lock pin and prevents the uncoupling of the members until the latch is manually pivoted to the unlocking position.

It should be noted that the shaft 56 of the safety lock pin 22 must extend beyond the lower plate 18 of the wagon hitch 14 an amount (distance B) at least as great as the distance between the retaining disk 60 and the lower edge of the latch 36 (distance A). In other words, distance B on the drawings must be equal to or greater than distance A on the drawings.

Therefore, it should be clear from the preceding description that the unique coupling device of this invention provides a relatively simple yet effective means for coupling two members together where it is desired to have pivotal movements between the members being coupled. The locking device of this invention has proven to be very reliable in keeping equipment, such as farm tractors and wagons, coupled together under a variety of conditions. It is very easy to couple and uncouple and less subject to damage caused by careless or rough usage when compared to existing coupling devices. Additionally, the coupling device of this invention is well suited to be installed on and utilized with both new and existing equipment.

I CLAIM:

1. A coupling device for locking two members together having aligned apertures extending therethrough, said coupling device comprising, in combination:

a locking pin means including a shaft adapted to be inserted into said apertures in said members to be coupled and a retaining means formed integral with said shaft at a location on said shaft spaced from the ends thereof and adapted to be supported by one of said members to be coupled when said shaft is inserted into said apertures in said members;

and a latching unit including a frame means mounted on said one of said members to be coupled, a latch plate pivotally mounted on said frame means in overlying relationship with respect to said one of said members and said retaining means on said locking pin means, said latch plate having a lug formed thereon and a tapered front edge adapted to be engaged by said retaining means on said locking pin means during insertion of said locking pin means into locking engagement with said members to be coupled, and a spring means attached at one end to said 2. A coupling device as set forth in claim 1 wherein said spring means includes a coil spring and a spring bolt suspended within said coil spring, said coil spring attached at one end to said frame and at its other end to said spring bolt, said spring bolt including a kerf formed therein for engaging said lug on said latch plate.

3. A coupling device as set forth in claim 2 wherein said frame means includes a base plate attached to said one of said members to be coupled, a U-shaped support mounted on said base plate, a pivot rod suspended across said support for pivotally mounting said latch plate in overlying relationship with respect to said one of said members to be coupled, and a stop plate attached to said support for stopping the pivotal movement of said latch plate when said latch plate is biased to said first position overlying said retaining means on said locking pin means to prevent withdrawal of said locking pin means from locking engagement with said members to be coupled.

4. A coupling device as set forth in claim 3 wherein said locking pin means further includes a head portion at one end of said shaft.

5. A coupling device as set forth in claim 4 wherein said head portion on said locking pin means is a rectangular bar attached in perpendicular relationship to said shaft.

6. A coupling device as set forth in claim 5 wherein said retaining means is a disk of sufficient diameter to extend under the tapered front edge of said latch plate when said latch plate is spring-biased to said first position overlying said retaining disk to prevent withdrawal of said locking pin means from locking engagement with said members being coupled.

\* \* \* \* \*

PO-1050
(5/69)

UNITED STATES PATENT OFFICE
CERTIFICATE OF CORRECTION

Patent No. 3,685,864        Dated  August 22, 1972

Inventor(s) Robert M. Hall

It is certified that error appears in the above-identified patent and that said Letters Patent are hereby corrected as shown below:

Column 4, line 40, after "said", insert -- frame means and engaging said latch plate at its other end to bias said latch plate to a first position overlying said retaining means on said locking pin means to prevent withdrawal of said locking pin means from locking engagement with said members being coupled, said latch plate being pivotable against said spring means to a second position not overlying said retaining means on said locking pin means when the tapered front edge of said latch plate is engaged by said retaining means during insertion of said locking pin means into locking engagement with said members to be coupled and also being pivotable against said spring means to said second position not overlying said retaining means on said locking means to facilitate withdrawal of said locking pin means from locking engagement with said members being coupled.--

Signed and sealed this 9th day of January 1973.

(SEAL)
Attest:

EDWARD M. FLETCHER, JR.
Attesting Officer

ROBERT GOTTSCHALK
Commissioner of Patents